United States Patent [19]

Givens

[11] 4,180,729
[45] Dec. 25, 1979

[54] URANIUM LOGGING IN EARTH FORMATIONS

[75] Inventor: Wyatt W. Givens, Dallas, Tex.

[73] Assignee: Mobil Oil Corporation, New York, N.Y.

[21] Appl. No.: 868,947

[22] Filed: Jan. 12, 1978

Related U.S. Application Data

[63] Continuation-in-part of Ser. No. 785,624, Apr. 7, 1977, abandoned.

[51] Int. Cl.² ............................................. G01V 5/00
[52] U.S. Cl. .................................. 250/265; 250/269
[58] Field of Search ............... 250/262, 264, 265, 266, 250/269, 390

[56] References Cited

U.S. PATENT DOCUMENTS

2,920,204  1/1960  Youmans .............................. 250/265

*Primary Examiner*—Alfred E. Smith
*Assistant Examiner*—Janice A. Howell
*Attorney, Agent, or Firm*—C. A. Huggett; William D. Jackson; William J. Scherback

[57] ABSTRACT

A technique is provided for assaying the formations surrounding a borehole for uranium. A borehole logging tool cyclically irradiates the formations with neutrons and responds to neutron fluxes produced during the period of time that prompt neutrons are being produced by the neutron fission of uranium in the formations. A borehole calibration tool employs a steady-state (continuous output) neutron source, firstly, to produce a response to neutron fluxes in models having known concentrations of uranium and, secondly, to produce a response to neutron fluxes in the formations surrounding the borehole. The neutron flux responses of the borehole calibration tool in both the model and the formations surrounding the borehole are utilized to correct the neutron flux response of the borehole logging tool for the effects of epithermal/thermal neutron moderation, scattering, and absorption within the borehole itself.

14 Claims, 7 Drawing Figures

FIG. 1
PFN LOGGING TOOL

BOREHOLE CALIBRATION TOOL

PROMPT FISSION NEUTRON RATIO (R) vs ORE GRADE $$R = \frac{PFN\ COUNT}{THERMAL\ NEUTRON\ COUNT}$$

URANIUM LOGGING IN EARTH FORMATIONS

CROSS REFERENCES TO RELATED APPLICATIONS

This application is a continuation-in-part of U.S. patent application Ser. No. 785,624 filed Apr. 7, 1977, now abandoned.

BACKGROUND OF THE INVENTION

This invention relates to a radioactive logging technique and more particularly to a prompt fission neutron uranium assaying technique.

When a formation containing a uranium ore is irradiated with fast neutrons, the uranium nuclei react to neutron bombardment by breaking into smaller nuclear fractions which are normally referred to as fission products. The fission of uranium is attended by the emission of prompt neutrons immediately upon occurrence of the fission reaction and also by the emission of delayed neutrons by the fission products subsequent to the fission reaction. The prompt fission neutrons are emitted at the time of the fission reaction, while the delayed neutrons are emitted by the fission products for an appreciable length of time following the fission reaction.

The use of fast neutron irradiation for the detection of uranium has also been explored in a paper by Jan. A. Czubek, "Pulsed Neutron Method for Uranium Well Logging," GEOPHYSICS, Vol. 37, No. 1, Feb. 1972, pp. 160–173. Czubek examines several phenomena associated with fast neutron irradiation of uranium-bearing formations and concludes that three can be employed to advantage in uranium detection techniques. Those which Czubek proposes for use as uranium content indicators are (1) epithermal neutron intensity resulting from prompt thermal neutron fission of uranium 235, (2) delayed thermal neutron intensity from prompt thermal neutron fission of uranium 235, and (3) delayed thermal neutron intensity from fast neutron fission of uranium 238.

In U.S. Pat. No. 3,686,503 to Givens et al, there is disclosed a borehole logging system for characterizing the uranium content of natural earth formations on the basis of measurements of delayed neutrons resulting from neutron fission of uranium. This patent discloses a subsurface assaying operation which is carried out by locating in a borehole adjacent a formation of interest a logging tool which includes a source of fast neutrons and a thermal neutron detector. The formation is irradiated with repetitive bursts of fast neutrons; and subsequent to each burst and after dissipation of the original source neutrons, delayed neutrons resulting from neutron fission of uranium are detected. The output from the detector is then recorded in order to obtain a log indicative of the uranium content of the formation.

In co-pending U.S. patent application Ser. No. 868,948, filed Jan. 12, 1978, to Wyatt W. Givens and William R. Mills, Jr., and entitled Logging Technique for Assaying for Uranium in Earth Formations, there is disclosed a borehole logging system employing the prompt fission neutron (PFN) uranium assaying technique. Both epithermal and thermal neutron fluxes resulting from the cyclical irradiation of a formation with bursts of fast neutrons are measured. These neutron fluxes are measured during the time period within each cycle of operation when prompt neutrons resulting from the thermal fission of uranium 235 are expected. The ratio of the epithermal neutron flux measurement to the thermal neutron flux measurement is proportional to the uranium 235 concentration for a fixed borehole diameter and borehole fluid, provided the epithermal and thermal neutron flux detectors have the same spacing with respect to the neutron source and further provided that the neutron fluxes detected by these detectors are measured during the same time period. Anything affecting the thermal neutron flux in the formation also affects the epithermal neutron flux as a measurement of prompt thermal fission neutrons from uranium 235 in the same manner. Therefore, the ratio of the responses of the PFN logging tool to epithermal and thermal neutron fluxes is independent of variations in the neutron generator output and of variations in the formation parameters of porosity, density, and thermal neutron macroscopic absorption. However, the actual epithermal neutron flux to thermal neutron flux ratio measured in the borehole with the PFN logging tool remains dependent upon the variable borehole parameters such as borehole diameter, borehole fluid, and borehole casing.

SUMMARY OF THE INVENTION

In accordance with the present invention, there is disclosed a new and improved method and system for logging the formations surrounding a borehole for uranium by detecting and counting prompt fission neutrons resulting from the thermal neutron fission of uranium 235.

More particularly, a prompt fission neutron logging tool is lowered into a borehole adjacent a formation of interest suspected of containing uranium and is cyclically operated to irradiate such formation with bursts of fast neutrons. Both epithermal and thermal neutron fluxes are measured by the prompt fission neutron logging tool at equally spaced distances from the pulsed neutron source during those periods of time that prompt neutrons are being produced from neutron fission of uranium in the formation. To correct such epithermal and thermal neutron flux responses of the prompt fission neutron logging tool for the effects of the epithermal/thermal neutron moderation, scattering, and absorption characteristics of the borehole itself, a borehole calibration tool is also lowered into the borehole adjacent the formation of interest and is operated to irradiate such formation with a steady-state source of fast neutrons. Both epithermal and thermal neutron fluxes are measured by the borehole calibration tool at the same, equally spaced distances from the steady-state neutron source. The source-to-detectors spacing need not be the same in the calibration tool and the prompt fission neutron logging tool. The source-to-detectors spacing in the calibration logging tool is selected to give a correction function of the simplest form. Preferably, before logging the formation of interest, the borehole calibration tool is operated in calibration models having known uranium concentrations. The epithermal and thermal neutron responses and in particular the ratio of the epithermal to thermal neutron fluxes as measured with the calibration tool will be single valued over a wide range of uranium concentration (zero to several lbs $U_3O_8/ft^3$), provided the borehole and other matrix parameters are the same. This is true because for the range of uranium concentrations commonly found in ore, the contribution of fission neutrons is insignificantly small and cannot be detected in the presence of neutrons from a continuous output source. The actual uranium concentration of the formation of interest as identified by the response of the prompt fission neutron logging tool can then be modified by the responses of the borehole calibration tool in both the borehole and the calibration models to yield a corrected uranium concentration for the formation of interest. Even more particularly, a function of the ratio of the response of the borehole calibration tool in the calibration models to the response of the borehole calibration tool in the borehole is multiplied by the response of the prompt fission neutron logging tool to produce an indication of the actual uranium concentration in the formation of interest surrounding the borehole. Eliminated from such indication are the adverse effects of the epithermal/thermal neutron moderation, scattering, and absorption characteristics of the borehole on the response of the prompt fission neutron logging tool to epithermal and thermal neutrons.

DESCRIPTION OF THE PREFERRED EMBODIMENT

As noted in the aforementioned co-pending U.S. patent application of Givens et al, the ratio of the responses of a PFN logging tool to epithermal and thermal neutrons is proportional to the uranium 235 concentration in the formations surrounding a borehole even though formation parameters of porosity, density, and thermal neutron macroscopic absorption cross section may vary.

Figures 1, 7:
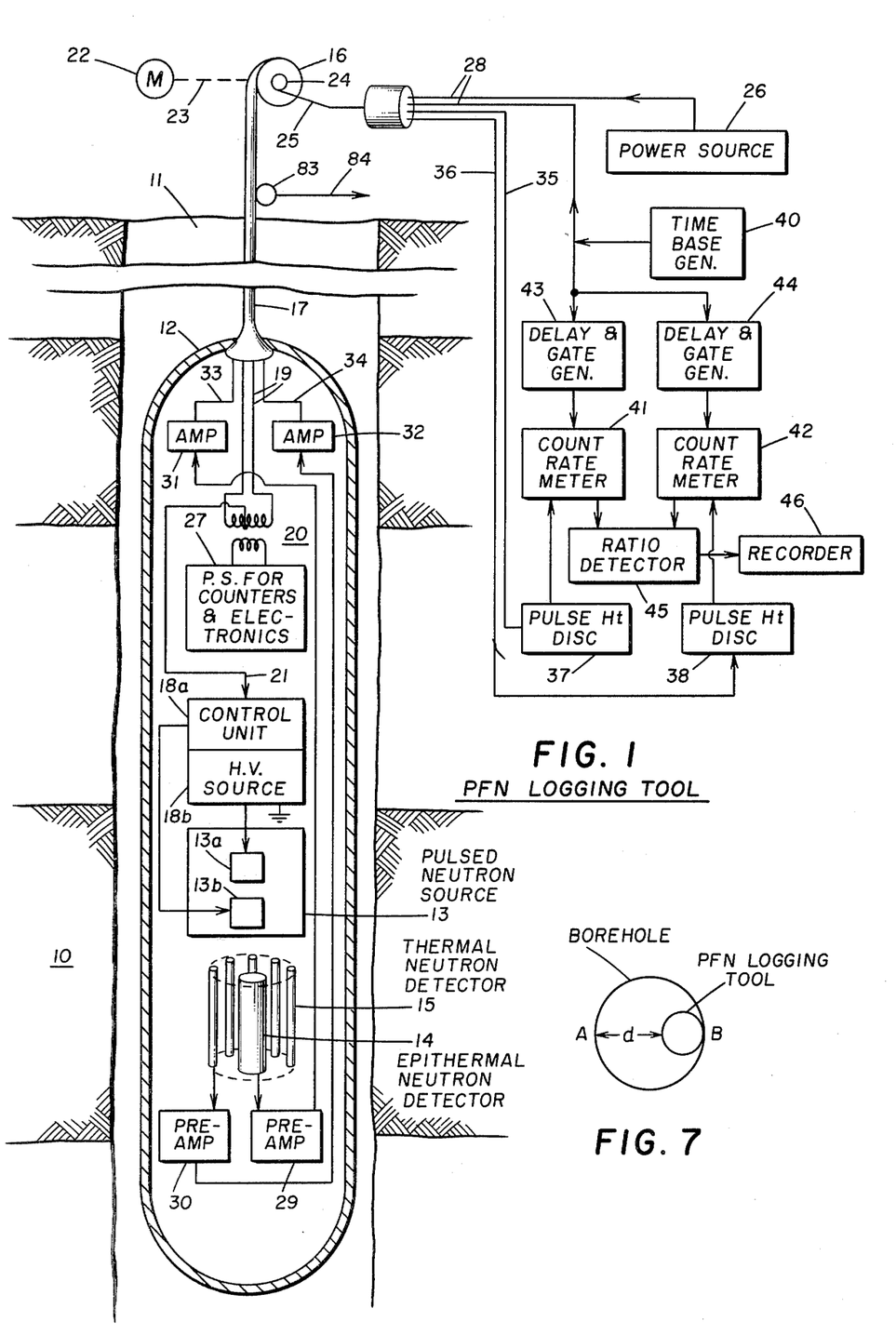
FIG. 1 illustrates a prompt fission neutron (PFN) logging tool for carrying out the present invention.
FIG. 7 illustrates a PFN logging tool resting against one side of the borehole.

Ideally, the use of the PFN logging tool of FIG. 1 having the same diameter as the borehole would maximize the response of the tool to epithermal and thermal neutrons. In actual operation, however, both field boreholes and calibration model boreholes are larger than the logging tool and, unless centralizing means is provided, the logging tool will rest against one side of the borehole as illustrated in FIG. 7. The epithermal neutron response of the logging tool to the formation on the same side of the borehole as the logging tool is greater than the response to the formation on the opposite side of the borehole. The epithermal PFN neutrons produced by uranium in the formation on such opposite side of the borehole must traverse the borehole itself before being detected and counted by the logging tool. The fluid within the borehole through which these epithermal neutrons must travel may be water or drilling mud, for example. These fluids contain a high concentration of hydrogen which is very effective in reducing the energy of epithermal neutrons to thermal energy. As illustrated in FIG. 7, a number of epithermal neutrons entering the borehole at point A are reduced to thermal energy before reaching the epithermal neutron detector in the PFN logging tool resting against the opposite side of the borehole at point B and, consequently, they do not contribute to the epithermal neutron count of the logging tool. The magnitude of the loss of epithermal neutrons due to a hydrogen-rich borehole fluid is strongly dependent upon the borehole diameter or, more particularly, upon the distance d from the PFN logging tool across the borehole to the point A. Thermal neutrons are also absorbed in the borehole fluid, but the loss of thermal neutrons by scattering and absorption is generally small compared to the loss of epithermal neutrons due to moderation to thermal energy. Other borehole properties such as diameter, cased, uncased, etc., also have epithermal/thermal neutron moderation, scattering, and absorption characteristics. Therefore, the resulting effect is that the ratio of the responses of the logging tool to thermal and epithermal neutrons is reduced as compared to the ideal case wherein the logging tool and the borehole are of the same size.

It is, therefore, a specific aspect of the present invention to provide a PFN logging technique in which the measured responses of the PFN logging tool of FIG. 1 to epithermal and thermal neutrons are corrected for such epithermal/thermal neutron moderation, scattering, and absorption effects of the borehole. This technique employs the use of the borehole calibration tool of FIG. 2 in addition to the PFN logging tool. More particularly, the borehole calibration tool will be similar in configuration to the PFN logging tool except that a steady-state neutron source will be used in place of a pulsed neutron source. This borehole calibration tool is operated in a calibration borehole or models having known uranium concentrations. All borehole and matrix parameters except uranium concentration are the same. The borehole calibration tool is then taken into the field along with the PFN logging tool and is operated in each borehole in which the PFN logging tool is operated. The relationship between the ratios of the epithermal neutron to thermal neutron responses of the borehole calibration tool $r_i$ and the PFN logging tool $R_i$ is given as follows:

$$R_c = R_i \times f(r_c/r_i) \tag{1}$$

where, $r_c$ = ratio of the epithermal neutron to thermal neutron responses of borehole calibration tool in the calibration models and is single valued, $r_i$ = ratio of epithermal neutron to thermal neutron responses of borehole calibration tool in the field borehole and is variable, $R_i$ = ratio of epithermal neutron to thermal neutron responses of PFN logging tool in the field borehole, and $R_c$ = ratio of the epithermal neutron to thermal neutron responses of the PFN logging tool in uranium calibration models.

Figure 3:
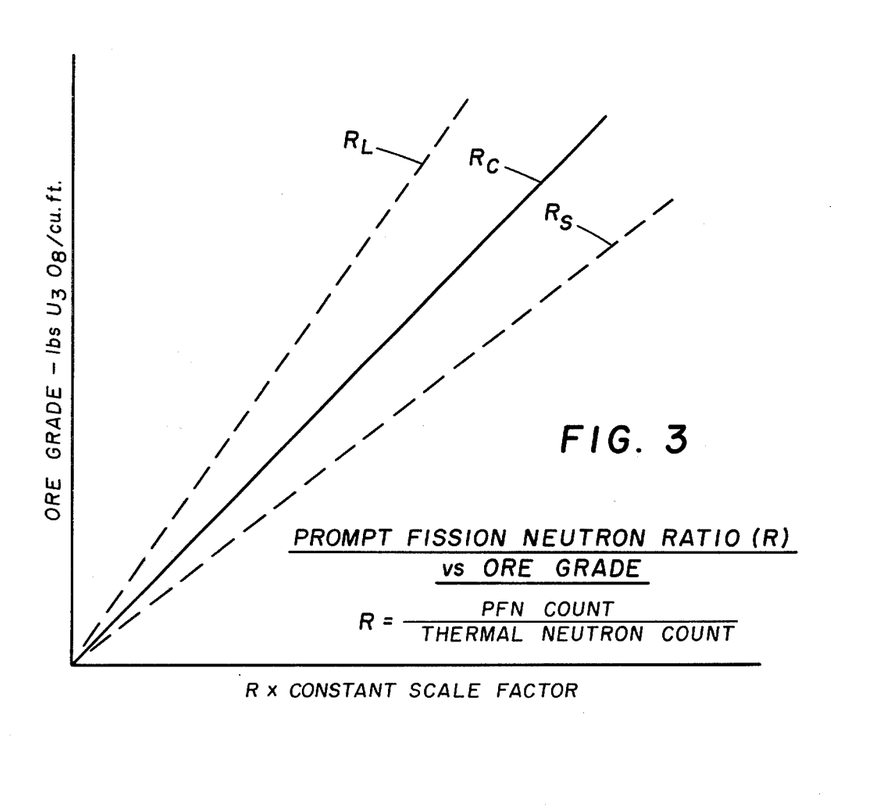
FIG. 3 illustrates the behavior of the prompt fission neutron ratio R by means of an experimentally determined calibration curve $R_c$ and two hypothetical curves $R_L$ and $R_S$.

A correction to the response ratio $R_i$ as expressed in Equation (1) can best be understood by referring to FIG. 3. The curve $R_c$ represents the actual PFN tool calibration as obtained in calibration models having identical borehole and matrix parameters except uranium concentration. The ratio $R_i$ of the PFN logging tool to the uranium 235 concentration in the formations surrounding the borehole includes effects of the borehole parameters of diameter, fluid, casing, etc. To obtain the ratio corresponding to uranium concentration in the formation, the PFN logging tool ratio $R_i$ must be corrected for the effects of changes in borehole parameters. As the borehole size becomes larger than the calibration borehole for a fixed uranium 235 ore grade, more epithermal neutrons are moderated to thermal energies before reaching the PFN logging tool. Consequently, the response ratio $R_i$ of the PFN logging tool in the larger borehole is decreased as represented by the $R_L$ curve in FIG. 3. Likewise, as the borehole size becomes smaller than the calibration borehole for a fixed uranium 235 ore grade, the response ratio $R_i$ is increased as represented by the $R_S$ curve in FIG. 3 due to more epithermal neutrons reaching the PFN logging tool.

Figure 4:
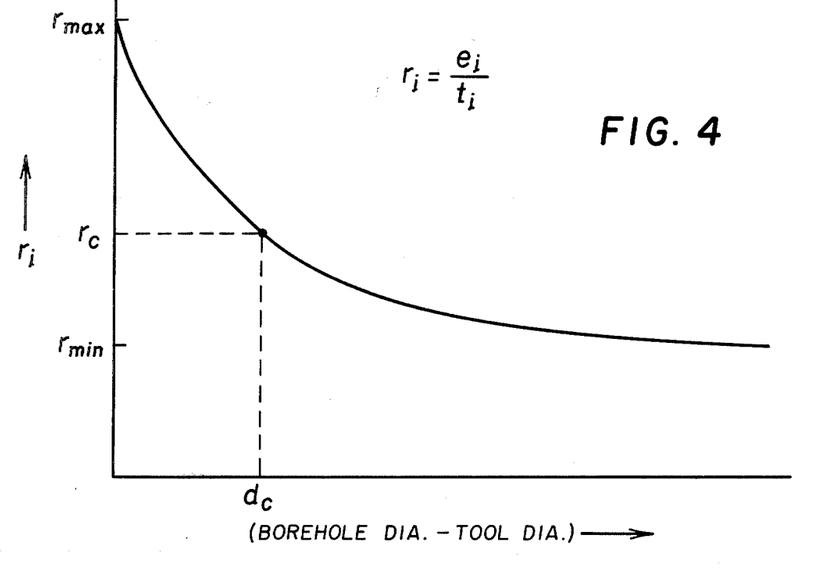
FIG. 4 illustrates the qualitative behavior of $r_i$, the ratio of epithermal to thermal neutron response from the borehole calibration tool.

In accordance with the expression of Equation (1), a function of the ratio of the responses $r_c/r_i$ of the borehole calibration tool can be used to correct the $R_i$ response ratio of the PFN logging tool for the differing epithermal/thermal neutron moderation, scattering, and absorption effects due to changes in borehole diameter, borehole fluid, etc., in the field. There will be one value for the ratio $r_c$ in the calibration models; however, the ratio $r_i$ will vary due to changing borehole parameters encountered in the field. Referring to FIG. 4 it can be seen that the ratio $r_i$ is equal to the ratio $r_c$ when the combination of borehole parameters, diameter, fluid, etc., are equivalent to those of the calibration models. As the field borehole becomes larger than the borehole of the calibration models, the ratio $r_i$ asymptotically approaches a minimum value $r_{min}$. As the field borehole becomes smaller than the borehole of the calibration models, the ratio $r_i$ approaches a maximum value $r_{max}$. This maximum value occurs when the borehole is the same size as the borehole calibration tool itself.

Both the PFN logging tool and the borehole calibration tool will now be described in detail in conjunction with FIGS. 1 and 2 respectively.

PFN Logging Tool (FIG. 1)

A formation to be investigated or assayed for uranium content is shown at 10 in FIG. 1. It is traversed by a borehole 11. Assaying is carried out by lowering the PFN logging tool 12 into the borehole to the level of the formation 10. The PFN logging tool 12 is suspended in the borehole 11 by means of a logging cable 17. In one embodiment, the tool includes a neutron source 13 that is preferably an accelerator-type, 14-Mev source which comprises a neutron generator tube. Pulsing of the neutron generator tube is carried out in response to a trigger pulse supplied by the uphole system. The output of the neutron generator tube is a burst of fast neutrons spaced in time for irradiation of the formation 10.

As noted in the aforementioned patent to Givens et al, delayed fission neutrons from the fission reaction of uranium are measured after the original source neutrons have dissipated, which is in the order of a few milliseconds. However, prompt fission neutrons are produced within microseconds after the neutron burst from the source of fast neutrons.

To carry out this measurement of prompt fission neutrons within milliseconds after each neutron burst, there is provided an eipthermal neutron detector 14 and a thermal neutron detector 15. In the preferred embodiment as illustrated in FIG. 1, the source 13 is operated between 304 and 10,000 bursts per second, each burst having a duration of about 5 to 100 microseconds as shown by the period $t_b$. At a preferable burst rate of 1,000 bursts per second, the neutron output of the source 13 will produce in the order of $10^8$ neutrons per second. A waiting period $t_w$ follows each neutron burst to allow the 14-Mev neutrons from the source to moderate to the thermal energy level of about 0.025 ev. A sufficient waiting time period $t_w$ has been found to be about 50 to 100 microseconds. During the remaining time period $t_c$ before the next neutron burst, the number of neutrons detected by the epithermal neutron detector 14 and the thermal neutron detector 15 is counted by the uphole system. The uphole system is gated so as to count the detected neutrons during the 800- to 945-microsecond counting period $t_c$ following each waiting time period $t_w$. More details of this cyclical activation of the borehole logging tool and the counting of neutrons detected during the $t_c$ counting period of each cycle will now be described.

The PFN logging tool 12 comprises a steel, aluminum, or other suitable housing supported by the cable 17. This cable is driven from the drum 16 by the motor 22 and the connection 23. Slip rings 24 and brushes 25 are employed to couple the conductors of cable 17 to the uphole recording system for the transmission of signals and voltages. Trigger pulses generated by the time base generator 40 are periodically applied by way of conductors 28, slip rings 24, brushes 25, cable conductors 19, and downhole transformer 20 to actuate the control unit 18a for the production of high-voltage pulses required to cyclically activate the neutron source 13. In the preferred embodiment, this neutron source is an accelerator-type employing a neutron generator tube having a target and an ion source. A neutron source of this type is manufactured by Kaman Nuclear of Colorado Springs Colo. The high-voltage supply 18b provides high-voltage D.C., preferably 80 to 150 kilovolts at about 100 microamps, to the target 13a of the neutron source. The control unit 18a, in response to pulses from the time base generator 40, applies high-voltage pulses to the ion source 13b, preferably in the range of 1,000 pulses per second. These pulses are of about 3 kilovolts in amplitude and 5 to 100 microseconds' duration. This provides a $10^8$-neutron/second output from the neutron source. A preferable trigger pulse rate is 1,000 pulses per second.

Power for the remaining electronics of the logging tool is supplied by the downhole power source 27. Power to this downhole source is supplied from the uphole power source 26 by way of conductors 28, slip rings 24, brushes 25, cable conductors 19, and downhole transformer 20. For simplicity, connection is not shown between the downhole power source 27 and the other downhole electronics such as the preamplifiers 29 and 30 and the amplifiers 31 and 32.

The neutron detectors 14 and 15 are concentrically mounted (by support structure not shown) with respect to each other about an axis parallel to the borehole wall so as to be equally sensitive to the epithermal and thermal neutron die-away measurements of the formation surrounding the borehole. The epithermal neutron detector 14 preferably is a helium-3 detector in cylindrical form covered with a shield that absorbs thermal neutrons, such as, for example, cadmium. The thermal neutron detector 15 preferably is a plurality of helium-3 detectors concentrically spaced about the epithermal neutron detector 14, with their outputs joined together.

Figure 5:
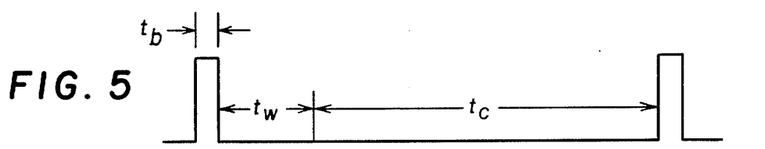
FIG. 5 is a timing diagram representative of the cyclical operation of the PFN tool of FIG. 1.

The outputs from neutron detectors 14 and 15 are applied by way of the preamplifiers 29 and 30, amplifiers 31 and 32, cable conductors 33 and 34, uphole conductors 35 and 36, and pulse height discriminators 37 and 38 to the gated count rate meters 41 and 42, respectively. Pulse height discriminator 37 is adjusted to pass to the count rate meter 41 those pulses produced by epithermal neutrons detected by the epithermal neutron detector 14. Pulse height discriminator 38 is adjusted to pass to the count rate meter 42 those pulses produced by thermal neutrons detected by the thermal neutron detector 15. Trigger pulses from the time base generator 40 are applied to delay and gate generators 43 and 44, both of which produce gating pulses for the duration of the desired prompt fission thermal neutron counting period $t_c$, this period preferably beginning about 50 to 100 microseconds after each neutron burst and extending until the beginning of the next neutron burst as illustrated in the example of the preferred embodiment of FIG. 5.

These gating pulses are applied to the count rate meters 41 and 42 for enabling the counting of epithermal and thermal neutrons, respectively, during the preferred counting period $t_c$.

The epithermal neutron count fed to count rate meter 41 during each count period $t_c$ is a measure of the prompt thermal fission neutrons produced by thermal neutron fission of uranium 235. The thermal neutron flux in the formation is the source of the fission process of uranium 235. Anything affecting this thermal neutron flux also affects the epithermal neutron count as a measurement of prompt thermal fission neutrons from uranium 235. To correct the epithermal neutron count for the effects on the thermal neutron flux of bulk density, slowing-down time, and thermal neutron lifetime (directly related to the thermal neutron macroscopic absorption cross section $\Sigma_a$ of the formation), there is utilized a ratio detector 45 to divide the epithermal neutron count from count rate meter 41 by the thermal count from the count rate meter 42.

Figure 6:
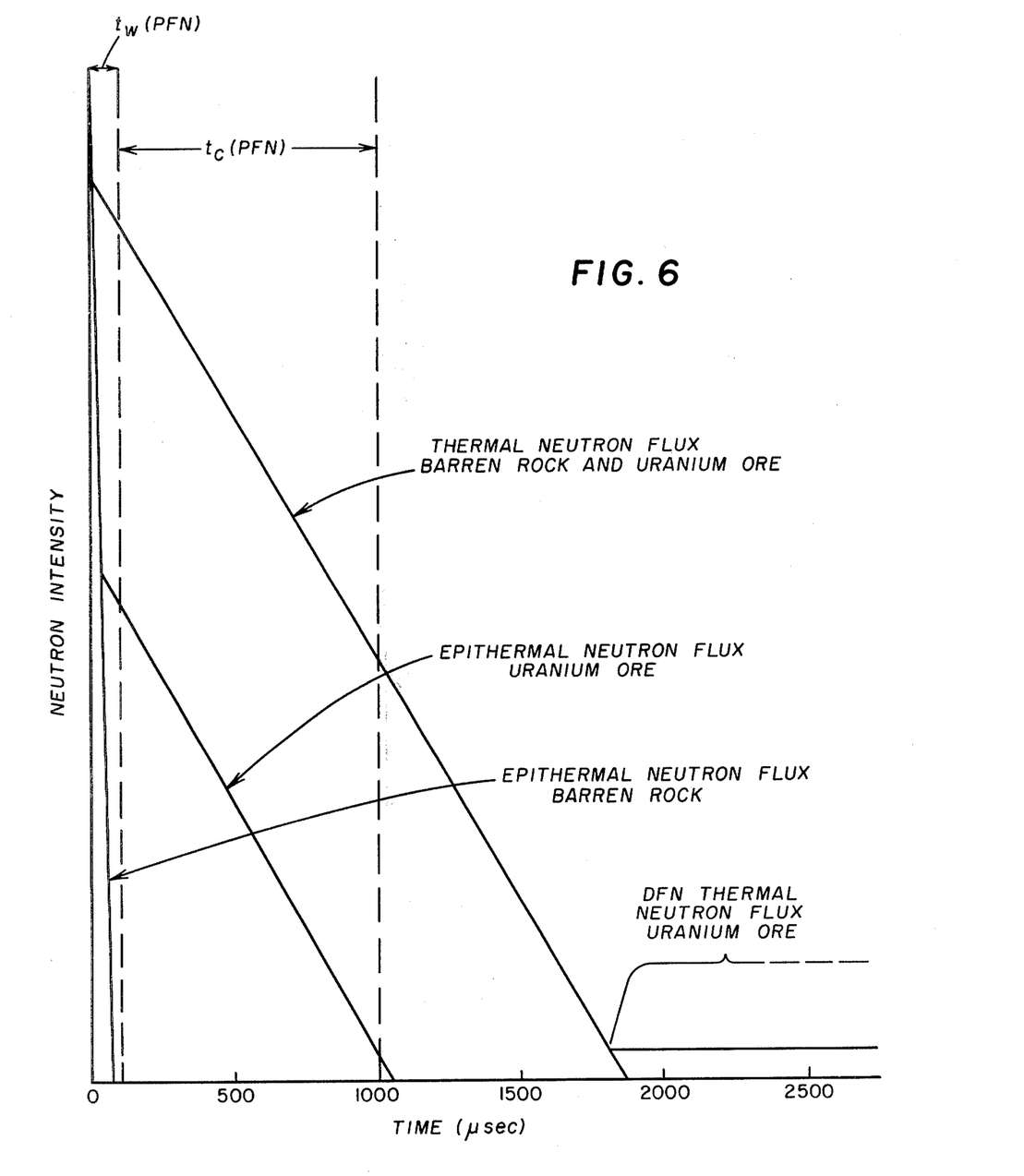
FIG. 6 illustrates characteristics of example subsurface formations as might be encountered when logging with the PFN tool of FIG. 1.

FIG. 6 illustrates the epithermal and thermal neutron fluxes as a function of time for a uranium ore-bearing formation and a barren formation, where both the ore-bearing and barren formations have the same macroscopic absorption cross section. The die-away rates measured by the epithermal and thermal neutron detector systems will be the same, provided the detector systems are properly located with respect to the neutron source. For this condition, i.e., both detector systems measuring the same die-away rate, the division of the epithermal neutron count or count rate by the thermal neutron count or count rate is represented by the following relationship:

$$C_{epi}/C_{ther} = K N_U \quad (2)$$

where, $N_U$ = number of uranium 235 atoms per cubic centimeter, provided both the thermal and epithermal neutron detector systems measure the same die-away rate and further provided that the thermal and epithermal neutron count rate meters are gated to count neutrons during the same counting period $t_c$. K is a constant term representing the ratio of the epithermal and thermal neutron detector efficiencies times the uranium 235 fission cross section. It can be seen that the ratio is zero for a barren formation and is directly proportional to the uranium concentration in a uranium-bearing formation. Upon further calibrating the ratio detector 45 in accordance with the constant term K, an output is provided to recorder 46 representative of the uranium 235 concentration in the formation.

Ratio detector 45 may be of a conventional type as disclosed on pages 338 and 339 in ELECTRONIC ANALOG COMPUTERS, Gravino A. Korn and Theresa M. Korn, McGraw-Hill Book Company, Inc., New York, 1956. It will be apparent to those skilled in the art that the ratio detector 45 can be calibrated in terms of the constant K by the proper selection of feedback and biasing resistors to give the uranium concentration in desired units of lbs $U_3O_8/ft^3$, kilograms $U_3O_8/meter^3$, etc. The constant is determined by measuring the ratio of the two detectors' efficiencies over a range of Uranium 235 concentrations as illustrated by the experimentally determined calibration curve $R_c$ in FIG. 4.

Figure 2:
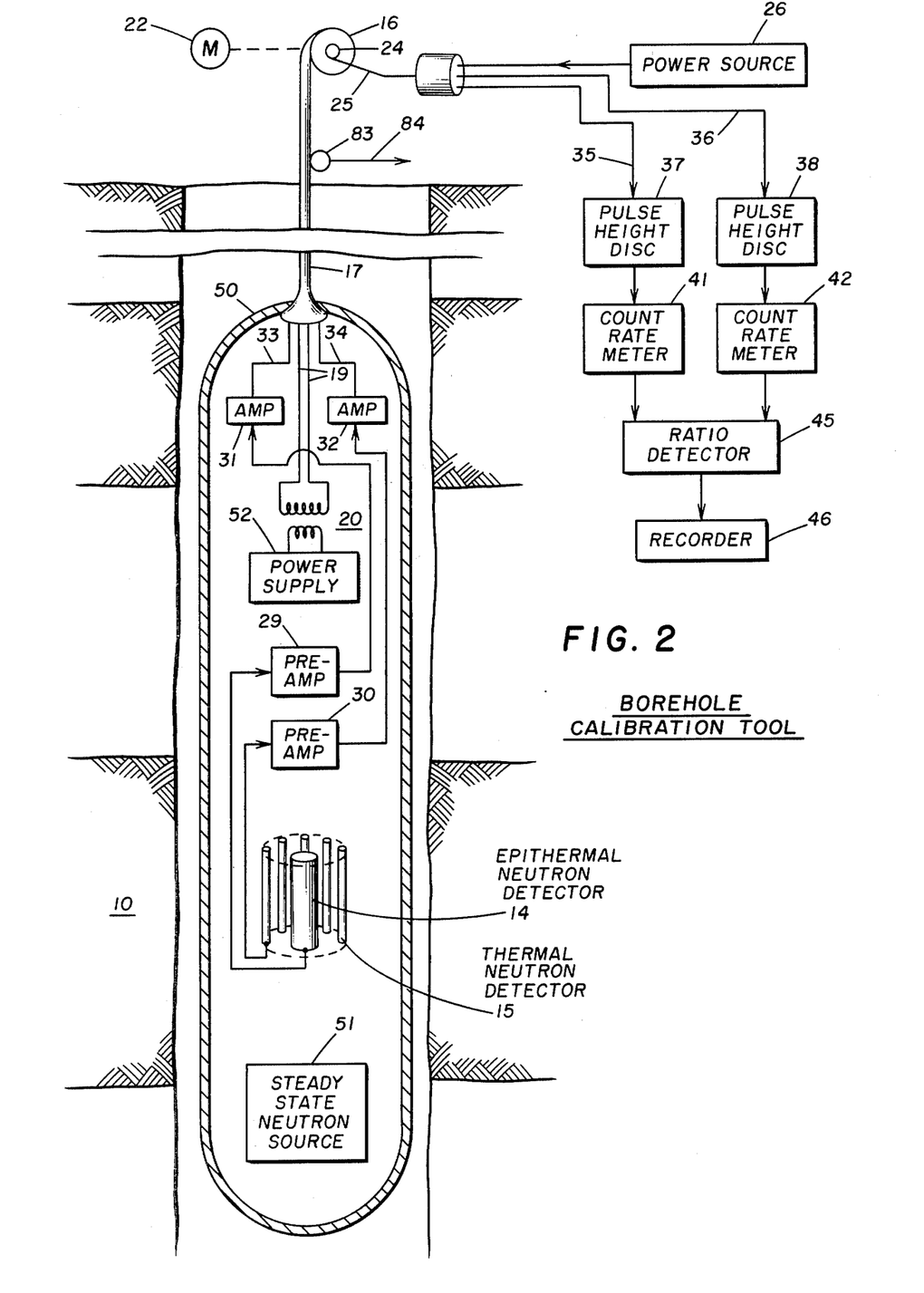
FIG. 2 illustrates a borehole calibration tool for carrying out the present invention.

Calibration Tool (FIG. 2)

The configuration of the borehole calibration tool 50 of FIG. 2 is like that of the PFN logging tool 12 of FIG. 1, with the exception that the pulsed neutron source 13, associated high-voltage supply 18b, and control electronics 18a of the PFN logging tool are replaced with a steady-state neutron source 51 and power supply 52. Such a steady-state neutron source may preferably be of the americium-beryllium type.

The uphole recording system for the borehole calibration tool will be the same as that used with the PFN logging tool, with the exception that the time base generator 40 and delay and gate generators 43 and 44 of the PFN logging tool will not be utilized.

The borehole calibration tool 50 is calibrated by measuring the ratio $r_c$ in one or more calibration boreholes or models having known uranium 235 concentrations and identical borehole and formation matrix parameters. The contribution of epithermal and thermal neutrons due to fission of uranium by the steady-state source neutrons is insignificantly small compared to the epithermal and thermal neutrons always present from the source itself. Therefore, the ratio $r_c$ is single valued over a range of uranium concentrations from zero to several lbs $U_3O_8$ per cubic foot. Thus, in ore grades normally encountered in nature, less than 2 lbs $U_3O_8/ft^3$, the ratio $r_i$ will not be affected by the extremely small contributions of fission neutrons.

The function f in the expression $f(r_c/r_i)$ of Equation (1) which is multiplied by the ratio of responses of the PFN logging tool in the field borehole $R_i$ to yield a corrected ratio $R_c$ is determined experimentally. For example, values of $R_i$ can be measured with the PFN logging tool in a borehole that has been cored and the core assayed. The calibration tool is also run in these boreholes to obtain the corresponding values $r_i$. The functional form of $f(r_c/r_i)$ by which the values $R_i$ are multiplied to give values $R_c$ corresponding to the ore grades obtained by core analysis is determined by regression analysis. Once the form of $f(r_c/r_i)$ is established, then only values $R_i$ and $r_i$ need be measured to obtain the ore grade.

In the foregoing-described preferred embodiment, detector 15 is a thermal neutron detector utilized for measuring thermal neutron flux that represents predominantly the thermal neutron parameters of the formation being logged. In an alternate embodiment, this same thermal neutron flux measurement may be carried out by the use of a gamma-ray detector that measures the thermal neutron capture gamma rays emitted by the formation. It is therefore to be understood that within the scope of the appended claims, the measurement of thermal neutron flux representing predominantly the thermal neutron parameters of the formation may be carried out by either the detection of thermal neutrons or thermal neutron capture gamma rays.

I claim:

1. A method for determining uranium ore grade comprising the steps of:
   (a) irradiating a known concentration of uranium with a steady source of fast neutrons,
   (b) determining the ratio of epithermal to thermal neutron fluxes in said known concentration of uranium in response to the irradiation of step (a),
   (c) irradiating an unknown concentration of uranium with a steady source of fast neutrons,
   (d) determining the ratio of epithermal to thermal neutron fluxes in said unknown concentration of uranium in response to the irradiation of step (c),
   (e) irradiating said unknown concentration of uranium with repetitive bursts of fast neutrons,
   (f) determining the ratio of epithermal to thermal neutron fluxes in said unknown concentration of uranium in response to the irradiation of step (e) during the period of time that prompt neutrons are being produced from neutron fission of said unknown concentration of uranium, and
   (g) comparing the ratios determined in steps (b), (d), and (f) as an indication of the ore grade of said unknown concentration of uranium.

2. The method of claim 1 wherein the step of comparing said ratios includes the step of multiplying said third ratio by a function of said first ratio divided by said second ratio.

3. In a method of assaying the formations traversed by a borehole for uranium by:
   (a) cyclically surrounding a neutron source to irradiate the formations surrounding the borehole, and
   (b) measuring epithermal and thermal neutron fluxes at equally spaced distances from said neutron source during the time period that prompt neutrons are being produced from neutron fission of uranium in the formations surrounding the borehole, said measurements being indicative of the uranium concentration in the formations surrounding the borehole, the improvement of correcting said measurements for the epithermal/thermal neutron moderation, scattering, and absorption effects within the borehole, comprising the steps of:
   (i) operating a steady-state source of neutrons to irradiate a known concentration of uranium,
   (ii) measuring epithermal and thermal neutron fluxes in said known concentration of uranium at equally spaced distances from said steady-state source of neutrons,
   (iii) operating said steady-state source of neutrons to irradiate the formations surrounding said borehole,
   (iv) measuring epithermal and thermal neutron fluxes in said formations at said equally spaced distances from said steady-state source of neutrons, and
   (v) modifying the measurements of epithermal and thermal neutron fluxes produced by the formations surrounding the borehole in response to said cyclically operated neutron source in accordance with the measurements of epithermal and thermal neutron fluxes produced in the formations surrounding said borehole in response to said steady-state neutron source.

4. The method of claim 3 wherein the step of modifying the measurements of epithermal to thermal neutron fluxes produced by the formations surrounding the borehole in response to said cyclically operated neutron source is in accordance with the following relationship:

$$R_c = R_i \times f(r_c/r_i)$$

where,
   $r_c$ = ratio of epithermal to thermal neutron fluxes produced in said known concentration of uranium in response to said steady-state source,
   $r_i$ = ratio of epithermal to thermal neutron fluxes produced in the formations surrounding the borehole in response to said steady-state source,
   $R_i$ = ratio of epithermal to thermal neutron fluxes produced in the formations surrounding the borehole in response to said cyclically operated neutron source,
   $R_c$ = indication of uranium concentration of the formations surrounding the borehole corrected for borehole effects of epithermal/thermal neutron moderation, scattering, and absorption, and
   f = function of $(r_c/r_i)$.

5. The method of claim 4 wherein the function f is based upon the uranium concentration in the formations surrounding the borehole determined from core samples.

6. The method of claim 4 wherein the function f is based upon the uranium concentration in the formations surrounding the borehole determined from a delayed fission neutron assay logging operation.

7. The method of claim 4 wherein steps (ii) and (iv) of claim 3 are carried out at varied distances from said steady-state source to identify the simplest form of the correction function $f(r_c/r_i)$.

8. The method of claim 4 wherein step (b) of claim 3 is carried out at varied distances from said cyclically operated source to identify a maximum response to uranium.

9. A system for logging the formations traversed by a borehole for uranium, comprising:
   (a) a first borehole tool having a steady-state neutron source and epithermal and thermal neutron flux detectors equally spaced from said steady-state neutron source,
   (b) means for exposing a calibration model having a known concentration of uranium to said steady-state source of neutrons of said first borehole tool and for producing a calibration record of the response of the detectors of said first borehole tool to epithermal and thermal neutron fluxes produced in said known concentration of uranium,
   (c) a second borehole tool having a pulsed neutron source and epithermal and thermal neutron flux detectors equally spaced from said pulsed neutron source,
   (d) means for moving both said first and second borehole tools through a borehole for which the surrounding formations are to be logged for uranium concentration,
   (e) means for producing a first signal representative of the response of the detectors of said first borehole tool to epithermal and thermal neutron fluxes during the period of time that the steady-state neutron source of said first borehole tool is irradiating the formations surrounding the borehole with neutrons, (f) means for producing a second signal representative of the response of the detectors of said second borehole tool to epithermal and thermal neutron fluxes during the period of time that prompt neutrons are being produced from neutron fission of uranium in the formations surrounding the borehole in response to repetitive bursts of neutrons from the pulsed neutron source of said second borehole tool, and (g) means for comparing said first and second signals with said calibration record as an indication of the uranium concentration in the formations surrounding the borehole.

10. The system of claim 9 wherein the configurations of the epithermal neutron flux detectors in said first and second borehole tools are identical.

11. The system of claim 9 wherein the configurations of the thermal neutron flux detectors in said first and second borehole tools are identical.

12. The system of claim 11 wherein said thermal neutron flux detector produces counts of the thermal neutrons arriving at said detector from the formations being logged.

13. The system of claim 11 wherein said thermal neutron flux detector produces counts of the thermal neutron capture gamma rays arriving at said detector from the formations being logged.

14. The system of claim 9 wherein the spacings of the epithermal and thermal neutron flux detectors from the neutron sources in said first and second borehole tools are identical.

* * * * *

UNITED STATES PATENT AND TRADEMARK OFFICE
CERTIFICATE OF CORRECTION

PATENT NO. : 4,180,729

DATED : December 25, 1979

INVENTOR(S) : Wyatt W. Givens

It is certified that error appears in the above-identified patent and that said Letters Patent are hereby corrected as shown below:

Column 5, line 64, "milliseconds" should read --microseconds--;
line 65, "eipthermal" should read --epithermal--.

Column 7, line 40, before "count from" insert --neutron--.

Column 9, line 37, "surrounding" should read --operating--.

Signed and Sealed this

Twenty-fifth Day of March 1980

[SEAL]

*Attest:*

SIDNEY A. DIAMOND

*Attesting Officer*       *Commissioner of Patents and Trademarks*